May 14, 1929.  R. A. RODRICK  1,712,718
MECHANICAL MOVEMENT
Filed Feb. 1, 1927  3 Sheets-Sheet 1

Raymond A. Rodrick
INVENTOR
BY Floyd E. Shannon
ATTORNEY

May 14, 1929.  R. A. RODRICK  1,712,718

MECHANICAL MOVEMENT

Filed Feb. 1, 1927  3 Sheets-Sheet 2

Raymond A. Rodrick
INVENTOR

BY F. E. Shannon
ATTORNEY

May 14, 1929.                R. A. RODRICK                1,712,718
                          MECHANICAL MOVEMENT
                          Filed Feb. 1, 1927        3 Sheets-Sheet 3

Raymond A. Rodrick
INVENTOR
BY Floyd E. Shannon
ATTORNEY

Patented May 14, 1929.

1,712,718

UNITED STATES PATENT OFFICE.

RAYMOND A. RODRICK, OF AKRON, OHIO, ASSIGNOR TO CLARENCE W. WHITE, OF AKRON, OHIO, AND HIMSELF.

MECHANICAL MOVEMENT.

Application filed February 1, 1927. Serial No. 165,090.

This invention relates to new and novel improvements in mechanism for converting a rotary motion into a reciprocatory motion.

While the invention is intended for general use, wherever it may be applied, it is particularly adapted for use as a power mechanism for wind-shield cleaners of the type in which a vertical wiper blade is alternately driven across the wind-shield from side to side.

Objects of the invention are to provide simple, durable mechanism which may be manufactured at a low cost and which may be operated to produce a reciprocatory motion to a wind-shield cleaner blade or other tool, part or object and to provide a construction which will be positive in operation and will operate with a minimum amount of power.

Further objects are to provide mechanism for producing reciprocatory strokes and to provide new and improved means which may be conveniently operated to regulate the length of the stroke.

An additional object is to provide a mechanism in which the carriage is driven in one direction by a worm and driven in the opposite direction by another worm and to provide new and novel means for shifting the carriage from operative engagement with one worm into operative engagement with the other.

The above objects are accomplished and additional ends are attained by the novel construction, combination and arrangement of parts hereinafter described and illustrated in the accompanying drawings, in which I have shown the invention applied to a windshield cleaner; it being understood that the invention may be adapted in different ways for various other devices and that modifications and changes may be made or resort had to substitutions which come within the spirit of the invention as set forth in the appended claims.

In the drawings like numerals of reference are employed to indicate like parts as the same may appear in any of the several views and in which:—

The invention will now be described with reference to the particular adaptation thereof disclosed in the drawings in which like characters of reference are employed to designate like parts as the same may appear in any of the several views.

Figure 1:
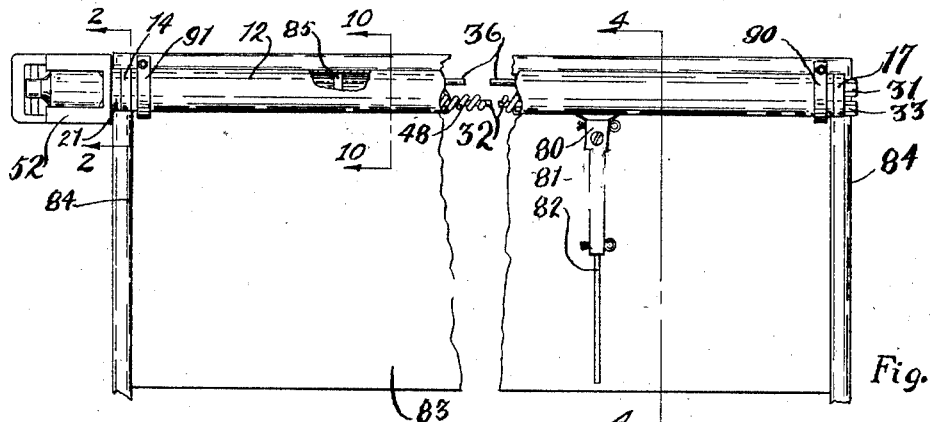
Figure 1 is a front, elevational view of an automobile wind-shield wiper constructed in accordance with this invention, parts being broken away to more clearly illustrate the invention and to conserve space.
Figures 2, 3:
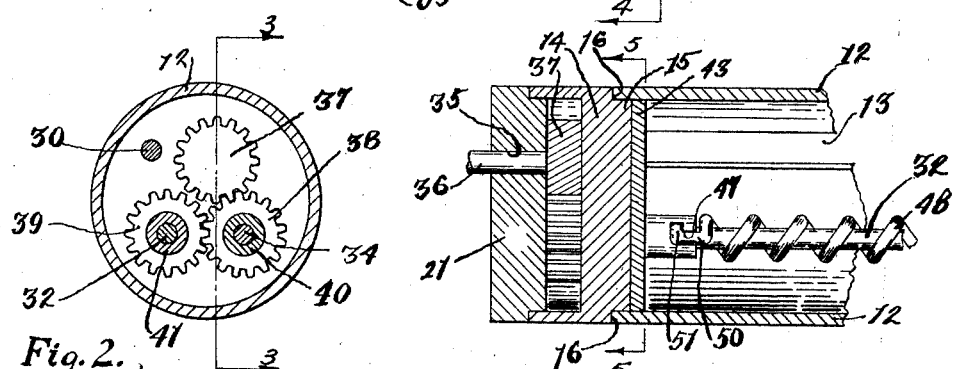
Figure 2 is a view in vertical, section, taken as indicated by the lines 2—2 of Figure 1.
Figure 3 is a view taken in vertical longitudinal section, as indicated by the lines 3—3 of Figure 2.
Figures 4, 5:
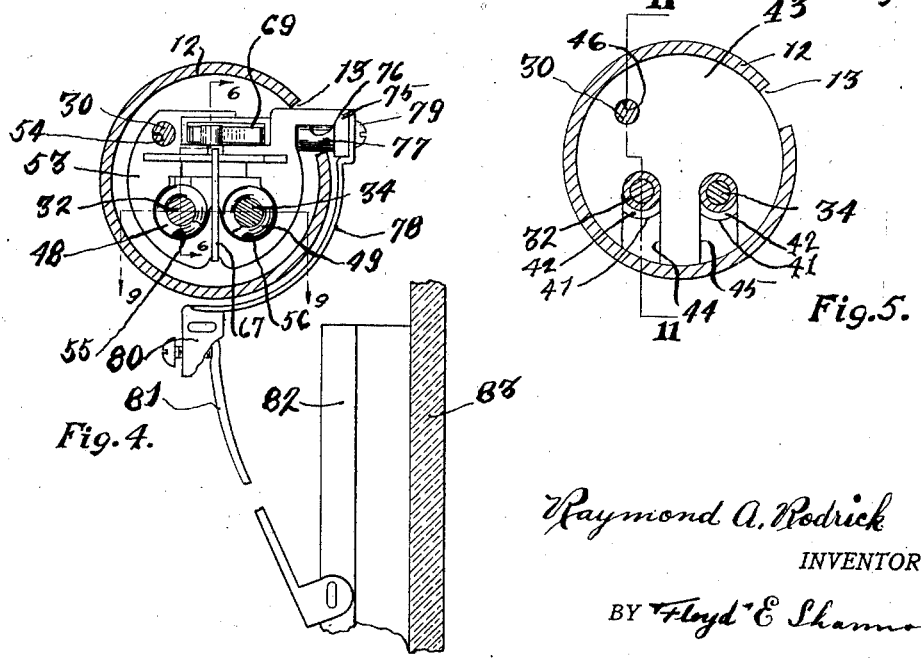
Figure 4 is a vertical, sectional view taken as indicated by the lines 4—4 of Figure 1.
Figure 5 is a vertical, cross sectional view taken as indicated by the lines 5—5 of Figure 3.
Figure 6:
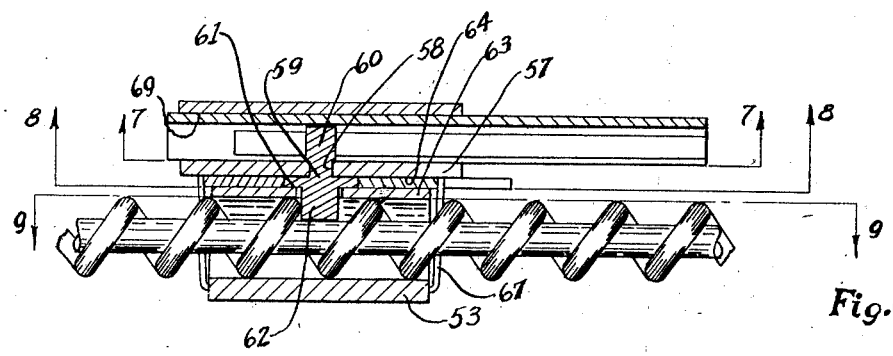
Figure 6 is a fragmentary view showing in front elevation a portion of one of the worms and illustrating the carriage in longitudinal, vertical section, the same being taken as indicated by the lines 6—6 of Figure 4.

In the drawings the numeral 12 denotes a cylindrical casing which is provided along one side thereof with a longitudinally extending slot 13. The numeral 14 denotes an end block which is preferably cylindrical in shape and formed of the same diameter as the casing 12. The block 14 is offset smaller at the inner end thereof to provide the reduced portion 15 which is adapted to be snugly received in the end of the casing 12. The reduced portion 15 forms an annular offset shoulder 16 which bears against the end of the casing 12 when the block 14 is operatively positioned thereon. The other end of the casing is likewise closed with the block 17 which is provided on the inner face thereof with a reduced portion 18 which is adapted to be snugly received in the end of the casing 12. The reduced portion 18 is formed thereon to provide a shoulder 19 which bears against the end of the casing when the block 17 is operatively positioned thereon. The block 14 is provided on the outer face with the cavity 20. The numeral 21 denotes a lid which is similar in construction to the block 14 and which is fitted against the outer end of said block 14 to close the cavity 20. The block 21 is provided with spaced, parallel, threaded bores 22 and 23 which extend therethrough at a point adjacent the bottom thereof. The block 21 is also provided with a threaded bore 24 which is formed therein in parallel relation to the bores 22 and 23 at a point adjacent the upper end of the block 21. The block 14 is likewise provided with relatively larger, parallel bores 25 and 26 which extend therethrough in parallel spaced relation. The bore 25 is in axial alinement with the bore 23 and the bore 26 is in axial alinement with the bore 22. A third bore 27 is formed in the block 14 in axial alinement with the threaded bore 24 in the block 21. The block 17 is likewise provided with parallel bores 28 which are formed therein in axial alinement with the bores 25 and 26. The block 17 is also provided with a bore 29 which extends therethrough in axial alinement with the bore 27.

The numeral 30 denotes a rod which is threaded at each end thereof and which is positioned through the bores 28, 27 and the threaded bore 24 so as to extend longitudinally through the casing 12. The rod 30 projects outwardly past the outer face of the block 17 and a nut 31 is operatively secured on the outwardly projecting end thereof and is operated to bear against the end of the block 17 thereby holding the blocks 17, 14 and 21 in position on the casing. A rod 32 which is also threaded at each end thereof, is operatively secured in the bore 22. The rod 32 extends through the bore 25 and one of the bores 28 in the block 17. A nut 33 is operatively secured on the outwardly projecting end thereof so as to bear against the block 17. A similar rod 34 is secured in the bore 22 of the block 21 and extends through the bore 26 and the other bore 28 in the block 17. A nut similar to the nuts 33 and 31 is operatively positioned on the outer end of the rod 34 so as to bear against the outer end of the casing 17. It will thus be seen that the blocks 29 and the blocks 17 and 14 are secured in position against each end of the casing so as to form an end wall thereof and that the lid 21 is likewise secured in position. The nuts 31 and 33 are operated so as to exert a longitudinal pull on the rods 24, 34 and 32 whereby the same will be taut. The lid 21 is also provided with a bore 35 which is formed therein in parallel spaced relation to the bores 24, 23 and 22. A driving shaft 36 is rotatably mounted in the bore 35 and a spur gear 37 is fixedly secured on the inner end of the shaft 36 so as to be positioned in the cavity 20. A spur gear 38 is mounted on the rod 34 so as to be in mesh with the gear 37. The numeral 39 denotes a gear which is in mesh with the gear 38 and which is rotatably mounted on the shaft 32. The gear 38 is provided with a cylindrical hub 40 which is positioned in the bore 26 in the block 14. The gear 39 is likewise provided with a hub 41 which is positioned in the bore 25 in the block 14. Each of the hubs 40 and 41 project inwardly past the inner face of the extension 15 and each hub is provided with an annular groove 42. The grooves 42 on the said hubs are formed therein so as to be positioned inwardly from the inner face of the reduced portion 15. The numeral 43 denotes a plate which is provided with two parallel notches 44 and 45. The notches 44 and 45 extend therein from the lower edge thereof whereby the gears 38 and 39 may be properly positioned in the bores 25 and 26 and the plates 43 positioned thereon with the walls of the slots 44 and 45 positioned in grooves 42 in the hubs 41 thereby holding the said gears from longitudinal movement. The plate 43 is also provided with a bore 46 in which is received the rod 30. Each of the hubs 40 and 41 are provided on the circumferential face thereof with an L-shaped recess which is formed therein so as to extend inwardly to the inner axial end thereof.

The numerals 48 and 49 denote spiral springs which form the driving worms. The spring 48 is rotatably mounted on the rod 32 and the spring 49 is likewise mounted on the rod 34. Each spring 48 and 49 is provided on the driven end thereof with a straight shank 50 which terminates in a right angle portion 51. The shank 50 and the angle portion 51 on each of the springs 48 and 49 are seated in one of the recesses 47 on the hubs 40 and 41 whereby a rotation of the hub 40 and 41 will cause a rotation of the springs 48 and 49. While the shaft 36 may be operatively connected to any suitable driving element, I have shown an electric motor 52 which may be secured against the outer face of the block 21 as shown in Figure 1. In the construction shown, the numeral 36 is used to denote the driving shaft of the motor.

Figures 7, 8, 9:
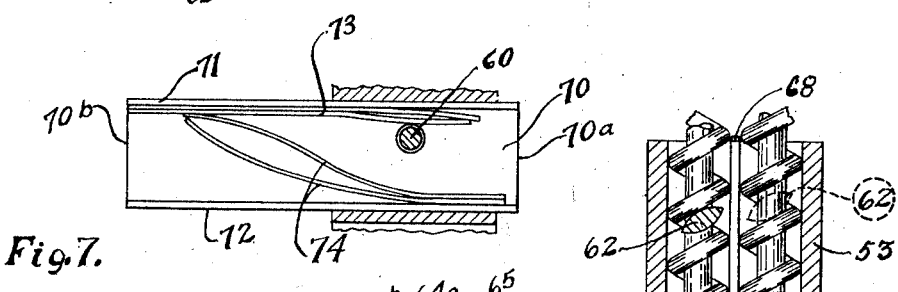
Figure 7 is a sectional view showing a portion of the carriage, the same being taken as indicated by the lines 7—7 of Figure 6.
Figure 8 is a similar view taken as indicated by the lines 8—8 of Figure 6.
Figure 9 is a fragmentary view showing a plan view of a portion of the two worms employed in carrying out the invention and illustrating the supporting structure of the carriage in horizontal, longitudinal section as shown by the lines 9—9 of Figure 4.
Figure 10:
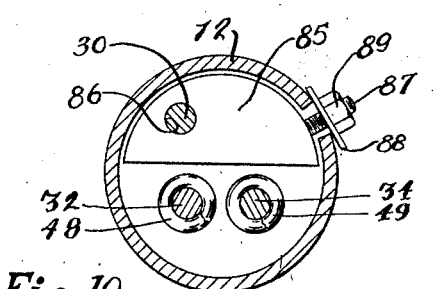
Figure 10 is a cross sectional view taken as indicated by the lines 10—10 of Figure 1.
Figure 11:
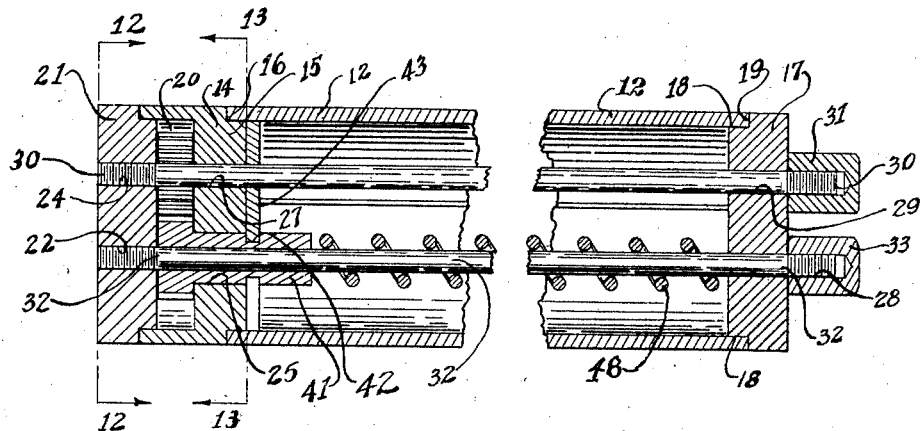
Figure 11 is a sectional view of a windshield power mechanism constructed in accordance with this invention, the same being broken away to conserve space and being taken as indicated by the lines 11—11 of Figure 5.
Figure 12:
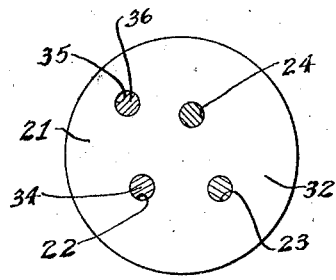
Figure 12 is a cross sectional view taken as indicated by the lines 12—12 of Figure 11.
Figure 13:
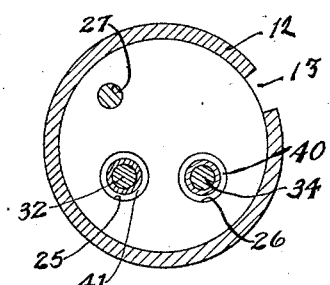
Figure 13 is a cross sectional view taken as indicated by the lines 13—13 of Figure 11.

The numeral 53 is used generally to denote a carriage which is mounted for longitudinal movement in the cavity of the casing 12. The carriage 53 is provided with a bore 54 in which is received the rod 30. The carriage 54 is also provided with suitable openings 55 and 56 which are substantially larger than the springs 48 and 49 and through which the said springs extend without contact therewith. The carriage 53 is provided with an intermediate support 57 which is provided with a slot 58 which is formed therein so as to be disposed at a right angle to the rods 32 and 34. The shifting member 59 is slidably mounted in the slot 58. The shifting member 59 is provided with a suitable head 60 which projects upwardly therefrom and overlies the portions of the wall 57 adjacent the slot 58 whereby the member 59 is secured against downward movement in said slot. The shifting member 59 is provided in the plane immediately below the lower face of the wall 57 with an outwardly projecting flange 61. The flange 61 forms a flat rectangular body which bears against the lower face of the wall. The shifting member 59 is provided with an elliptical engaging member 62 which projects downwardly therefrom to a horizontal plane immediately above the rods 32 and 34. The engaging member 62 is disposed with its greatest diameter extending in parallel relation to the angle of the convolutions of the springs 48 and 49. The arrangement is such that the member 59 when shifted to one side of the slot 58 brings the lug 52 into operative engagement with the spring 48 as shown in Figure 9 and when shifted to the other end of said slot will bring the lug 62 to the dotted line position shown in Figure 9. The carriage 53 is also provided with a horizontal wall 63 which is disposed in parallel spaced relation to the wall 57 thereby forming a cavity 64 in which is positioned the rectangular flange 61. The wall 63 is provided with a slot similar to the slot 58 and the flange 61 overlies this slot.

The numerals 65 and 66 denote locking members which are substantially identical in construction. The locking members 65 and 66 are each composed of a flat piece of material of approximately the same thickness as the flange 61. Each of the said locking members is L-shaped in form and includes a stem portion in the form of a narrow strip 65$^a$ and 66$^a$ which is slidably mounted along the side walls 64$^a$ and 64$^b$ of the cavity 64 so as to extend longitudinally of the casing 12. Each of the members 65 and 66 are provided on one end thereof with an angle extension 66$^b$ and 65$^b$ which extends at a right angle to the strips 65$^a$ and 66$^a$. The locking members 65 and 66 are arranged in opposite relation to each other as shown in Figure 8 and the adjacent faces of the portions 65$^b$ and 66$^b$ are offset smaller at a point approximately half of their length, thus forming the offset shoulders 65$^c$ and 66$^c$.

The numeral 67 denotes a spring which is secured to the carriage 53 at a point adjacent the bottom thereof and which extends upwardly with the other end engaging the outer edge of the locking member 65, whereby it will be yieldably held in forced contact with the flange 61. A like spring 68 is secured to the other side of the carriage 53 so as to bear against the outer edge of the member 66$^b$, thus yieldably holding the said member against the opposite side of the flange 61. It will thus be seen that with the shifting member 59 positioned at one end of the slot 58 that the shoulder 66$^c$ will engage the flange 61 and hold the shifting member 59 from movement in said slot 58 and that a longitudinal movement of the strip 66$^a$ is necessary to disengage the flange 61 from the shoulder 66$^c$ to permit the shifting member 59 to be moved to the opposite end of the groove. It will also be seen that when the shifting member is moved to the opposite end of the slot that the spring 67 will act to move the member 65$^b$ toward the member 66$^b$ whereby the flange 61 will be engaged by the shoulder 65$^c$ and will be held in the opposite end of the slot 58 until the locking member 65 is moved to release the said flange 61 from the shoulder 65$^c$. The carriage 53 is also provided at a point immediately above the wall 57 with a pocket 69 which is longitudinally disposed in respect to the casing 12 and in which is mounted a flat member 70 having depending side walls 71 and 72. The member 70 is slidably mounted in the pocket 69. The numeral 73 is used to denote a double spring which is secured to the wall 71 at a point adjacent one end thereof.

The numeral 74 is used to denote a double leaf spring which is secured to the flange 72 at the opposite end of the member 70. The free ends of the springs 73 and 74 normally extend obliquely across the channel of the members 70 and each spring is arranged to contact with the head 60 on the shifting member 59. It will thus be seen that with the parts positioned as shown in Figure 8 that the head 60 will compress the spring 73 whereby the spring will press against the head 60 and force it to the other end of the slot 58 as soon as the flange 61 is released by the locking member 66$^a$ and that the other spring 74 will be likewise compressed when the member 70 is moved to the opposite position in the cavity 69. The carriage 53 is provided with an arm 75 which projects outwardly through the slot 13. The arm 75 is provided on the under side thereof with the recess 76 and a roller 77 is rotatably mounted therein on a horizontal axis disposed at a right angle to the wire 30. The roller 77 is thus arranged to bear against the edge of the casing 12 along the lower side of the slot 13.

The numeral 78 denotes an arm which is secured to the arm 75 by means of the screw 79 or other suitable means. The arm 78 is curved downwardly in parallel relation to the exterior face of the casing 12 to a point below the center thereof, at which point it is provided with a bracket 80. A spring arm 81 is secured in the bracket 80 so as to depend downwardly therefrom. A wiper member 82 is mounted on the lower end of the arm 81 so as to bear against the forward face of the glass 83 of the wind shield 84.

The numeral 85 denotes a stop plate which is provided with a bore 86, adapted to receive the rod 30 on which the plate 85 is slidably mounted. A screw pin 87 is secured to one edge of the plate 85 so as to project through the slot 13. A suitable washer 88 is positioned on said pin so as to overlie the opposing edges of the casing 12. A nut 89 is operatively positioned on the pin 87 whereby it may be operated to clamp the edges of the casing 12 between the washer 88 and the edge of the plate 85; thus adjustably securing the plate 85 against longitudinal movement on the rod 30. A motor 52 is designed to operate the gears 37, 38 and 39, thus rotating the worms 48 and 49 so that the upwardly presented portions thereof turn toward each other.

In the particular adaptation of the invention shown, the casing 12 is secured to the upper edge of the wind-shield by means of the clamps 90 and 91 so as to extend along the forward face of the wind shield 84. The stop 85 is then moved longitudinally on the wire 30 to position it at any point desired between the member 14 and the carriage 53. The nut 87 is then operated to bear against the washer 88 and secure the stop 85 in a fixed position. The motor 52 is operatively connected to a source of electrical energy and is operated to rotate the worms 48 and 49. With the member 70 positioned as shown in Figure 7, the worm engaging member 62 will be locked in position as shown in Figure 8. The rotation of the screw 49 will cause the worm engaging member 62 to be moved longitudinally along the said worm thus driving the carriage 53 longitudinally in the casing 12 until the end 70$^a$ of the plate 70 is brought into contact with the stop 85. The worm engaging member 62 will be driven further thus moving the carriage 53 to further compress the spring 73 so that it bears against the head 60. The movement continues until the arm 66$^a$ is brought into contact with the stop 85 whereupon a further movement will move the squared flange 61 out of engagement with the shoulder 66$^c$. The spring 73 will then act to move the shifting member 59 to the opposite end of the slot 58, whereby the squared flange 61 will be positioned against the arm 66$^a$ on the member 66. As the shifting member 59 is thus moved to the opposite end of the slot, the spring 67 acts to move the member 65 longitudinally of the carriage 53, causing the shoulder 65$^c$ to engage the squared flange 61, thus firmly locking it in position with the worm engaging member 62 in the dotted line position shown in Figure 9. This causes the worm engaging member 62 to be driven in the opposite direction by the worm 48, thus moving the carriage 53 in the opposite direction in the casing 12. This movement is continued until the end 70$^b$ of the plate 70 is brought in contact with the plate 43, whereupon a continued rotation of the shaft 49 will cause a movement of the carriage 53 relative to the plate 70 and causing the head 60 to move along the spring 74, compressing it against the side 72. This movement is continued until the arm 65$^a$ of the plate 65 is brought into forced contact with the plate 43 whereupon the carriage 53 is moved relative to the plate 65 thus causing the squared flange 61 to be moved out of engagement with the shoulder 65$^c$, releasing the worm engaging member 62 from locked engagement with the worm 49 whereupon the shifting member 59 is instantly moved by the action of the spring 74 to the opposite end of the slot 58, thus again bringing the worm engaging member 62 into driving contact with the worm 48. It will be seen that the spring 68 will operate to cause the flange 61 to be engaged by the shoulder 66$^c$ thus firmly locking the worm engaging lug 62 in an operative position relative to the worm 48. It will be seen that the position of the worm engaging member 62 is such that the rotation of the worm will normally tend to disengage the said member 62, that the same is held in operative engagement with the said worms because the shifting member 59 is locked in position by action of the plates 65 and 66. This provides a construction in which the shifting member will not be held in position against the said worm by the rotation thereof and may be instantly shifted at each end of the stroke.

While I have shown and described the invention as applied to the wind shield cleaner it is to be understood that the invention may be applied in numerous ways to devices of different kinds.

Having thus illustrated my invention and described the same in detail, what I claim as new and desire to secure by Letters Patent is:—

1. In a device of the class described, an elongated casing, end walls in said casing; parallel supporting rods secured to said end walls and extending longitudinally through said casing; two driving worms, said worms comprising coil springs, said driving worms rotatably mounted on two of said supporting rods, means to reversely rotate said worm members; a carriage slidably mounted on one of said rods, a worm engaging member mounted on said carriage, means carried by the carriage for shifting said worm engaging member into operative engagement with either of said driving worms, means to lock the worm engaging members in engagement with either of said worms and means on said carriage to release said lock and operate said shifting means.

2. In a device of the class described, an elongated casing, parallel supporting rods extending longitudinally therethrough; two driving worms, said worms comprising coil springs, each spring rotatably mounted on one of said supporting rods, means to rotate said worm members, a carriage slidably mounted on one of said rods, a worm engaging member mounted on said carriage, means carried by the carriage for shifting said worm engaging member into operative engagement with either of said driving worms, automatically operable means to lock the worm engaging members in engagement with either of said worms and means carried by said carriage to release said lock and operate said shifting means.

3. In a device of the class described, an elongated casing, a pair of parallel supporting rods extending longitudinally through said casing, two driving worms, said worms comprising coil springs one of said driving worms rotatably mounted on each supporting rod, means to oppositely rotate said worms, a third rod extending through said case in parallel relation to said supporting rods, a carriage slidably mounted on said third rod, a worm engaging member mounted on said carriage, means carried by the carriage for shifting said worm engaging member into operative engagement with either of said driving worms, automatically operable means to lock the worm engaging member in engagement with either of said worms, a stop positioned in said casing, said stop being adjustable to limit the travel of said carriage and means on said carriage to release said lock and operate said shifting means, said means being operated by being brought into forced contact with said stop or the end wall of said casing.

4. In a device of the class described, an elongated casing having a longitudinally directed slot in the wall thereof, a pair of parallel supporting rods extending longitudinally through said casing, two driving worms, said worms comprising coil springs one of said driving worms rotatably mounted on each supporting rod, means to oppositely rotate said worm members, a third rod extending through said case in parallel relation to said supporting rods, a carriage supported by said third rod and the edge of the casing along one side of said slot, for sliding movement longitudinally in said casing, a worm engaging member mounted on said carriage, means carried by the carriage for shifting said worm engaging member into operative engagement with either of said driving worms, automatically operable means to lock the worm engaging member in engagement with either of said worms, a stop positioned in said casing, said stop being adjustable to limit the travel of said carriage and means on said carriage to release said lock and operate said shifting means, said means being operated by being brought into forced contact with said stop or the end wall of said casing and an arm projecting through said slot.

5. In a device of the class described, an arm, a spiral member for driving the arm in one direction, a spiral member for driving the arm in the other direction and means to interiorly support each of said members, said members being rotatably mounted on said supporting means.

6. In a device of the class described, a casing, a carriage mounted therein for movement longitudinally thereof, a worm for driving the carriage in one direction, a worm for driving the carriage in the other direction, each of said worms comprising a coil spring, rods fixed in said casing and extending longitudinally thereof, each of said springs rotatably mounted on one of said rods, a worm engaging member carried by said carriage, means to shift said member from one worm to the other, said means being automatically operable at predetermined points.

7. In a device of the class described, a casing, end blocks in said casing, a carriage mounted for reciprocatory movement between said blocks, a worm for driving the carriage in one direction, a worm for driving the carriage in the other direction, means to interiorly support each of said worms, said worms being rotatably mounted on said supporting means, a worm engaging member carried by said carriage, means on said carriage to lock said member into engagement with either of said worms and means to release said lock and shift said member to the other worm, said means operable by being brought into forced contact with each of said blocks and means to adjust one of said blocks.

In testimony whereof I have hereunto set my hand.

RAYMOND A. RODRICK.